US006101469A

United States Patent [19]

Curtin

[11] Patent Number: 6,101,469

[45] Date of Patent: Aug. 8, 2000

[54] FORMANT SHIFT-COMPENSATED SOUND SYNTHESIZER AND METHOD OF OPERATION THEREOF

[75] Inventor: Steven D. Curtin, Freehold, N.J.

[73] Assignee: Lucent Technologies Inc., Murray Hill, N.J.

[21] Appl. No.: 09/034,158

[22] Filed: Mar. 2, 1998

[51] Int. Cl.[7] ................................ G01L 5/02; G10H 1/12

[52] U.S. Cl. .......................... 704/258; 704/261; 704/278; 704/207; 704/218; 84/602; 84/603; 84/604; 84/623; 84/627; 84/633; 84/659; 84/661

[58] Field of Search ...................................... 704/258, 261

[56] References Cited

U.S. PATENT DOCUMENTS

| | | | |
|---|---|---|---|
| 5,007,095 | 4/1991 | Nara | 704/261 |
| 5,641,929 | 6/1997 | Okamoto et al. | 84/623 |
| 5,691,496 | 11/1997 | Suzuki et al. | 84/661 |

FOREIGN PATENT DOCUMENTS

| | | | |
|---|---|---|---|
| 0 437 105 A1 | 12/1990 | European Pat. Off. | 69/10 |
| 0 529 162 A1 | 8/1991 | European Pat. Off. | 69/10 |

OTHER PUBLICATIONS

Patent Abstracts of Japan: vol. 017, No. 707 (P–1667), Dec. 24, 1993 & JP 05 241580 A (Yamaha Corp), Sep. 21, 1993 * Abstract *.

Patent Abstracts of Japan: vol. 015, No. 030 (P–1157), Jan. 24, 1991 & JP 02 271398 A (Yamaha Corp), Nov. 6, 1990 * Abstract *.

"Digital Waveshaping Synthesis*" by Marc Le Brun: Journal of the Audio Engineering Society Apr. 1979; vol. 27, No. 4, pp. 250–266.

*Primary Examiner*—David D. Knepper
*Assistant Examiner*—Robert Sax

[57] ABSTRACT

For use in a synthesizer having a wave source that produces a periodic wave, frequency shifting circuitry for frequency-shifting the periodic wave and waveshaping circuitry for transforming the periodic wave into a waveform containing a formant, the frequency-shifting causing displacement of the formant, a circuit for, and method of, compensating for the displacement and a synthesizer employing the circuit or the method. In one embodiment, the circuit includes bias circuitry, coupled to the wave source and the frequency shifting circuitry, that introduces a bias into the periodic wave based on a degree to which the frequency shifting circuitry frequency shifts the periodic wave, the bias reducing a degree to which the formant is correspondingly frequency-shifted.

20 Claims, 3 Drawing Sheets

FORMANT SHIFT-COMPENSATED SOUND SYNTHESIZER AND METHOD OF OPERATION THEREOF

TECHNICAL FIELD OF THE INVENTION

The present invention is directed, in general, to sound synthesis and, more specifically, to a system and method for synthesizing sound in which formant shifts are attenuated without requiring the use of one or more linear predictive coding (LPC) filters.

BACKGROUND OF THE INVENTION

Speech is a primary form of communication, capable of conveying both information and emotion. Information is conveyed by words, while emotion is typically expressed by inflections in a speaker's voice. In humans, speech waveforms are created by vocal cords, located in the speaker's larynx. The waveforms then propagate through a vocal cavity, consisting of a series of flexible, irregularly shaped tubes, including the speaker's throat, mouth, and nasal passages. At the speaker's lips and various other structures, parts of the waveforms are further transmitted, while other parts are reflected. Flow of the waveforms may be significantly constricted or even completely interrupted by the speaker's uvula, teeth, tongue or lips.

Voiced sounds, such as vowels, occur when the vocal cords produce a regular waveform. Unvoiced sounds, such as consonants, occur when some part of the vocal cavity is tightened, restricting transmission of the waveforms.

The waveforms produced may be characterized by many parameters, including frequency and amplitude. Using Fourier analysis, speech waveforms may be represented in a frequency domain as a spectral frame, consisting of spectral components. The spectral frame contains the waveform's lowest, or fundamental, frequency, along with its harmonics (spectral components which occur at multiples of the fundamental frequency). Spectral components from string instruments and from vowels in speech typically occur at close to whole number multiples of the fundamental frequency, while spectral components from percussion instruments often occur at non-integral multiples of the fundamental frequency.

Humans are particularly sensitive to peaks and valleys in an overall shape of the spectral frame. Viewed in the frequency domain, the shape of the spectral frame is characterized by a number of formants. A formant, for purposes of the present discussion, is defined as a frequency region, spanning two or more harmonics, in which the amplitudes of the spectral components are significantly raised or lowered. In musical instruments, formants are formed by the shape of a resonating body. As different notes are played, the fundamental frequency changes, while the formants remain fixed. This fixed formant pattern allows a listener to identify different musical instruments easily and even to distinguish otherwise identical instruments (such as Stradivarius violins) from one another.

In speech, formants are created by the shape of the speaker's vocal cavity, including a position of the speaker's tongue and jaw. A basic unit of speech differentiation is a phoneme, defined as a sound at the level of consonants and vowels. A phoneme may be represented in the frequency domain as a single spectral frame, having a particular formant pattern. By changing the vocal cavity, a speaker can form different formants, and therefore, different phonemes, diphthongs, syllables and words.

With the widespread availability of computers with multimedia capability, it is desirable to enable computers to reproduce or synthesize both human speech and musical sounds. Computers use a number of different technologies to create sounds. Two widely used techniques are frequency modulation (FM) synthesis and wavetable synthesis.

Used extensively in digital musical and multimedia devices, FM synthesis techniques generally use one or more periodic modulator signals to modulate a frequency of a sinusoidal carrier signal. Though useful for creating expressive new synthesized sounds, FM synthesis techniques have proven disappointing at accurately recreating natural sounds.

An important factor in the utility of any synthesis technique is a degree of control that a user can exercise over the sounds produced. Wavetable synthesis systems, for example, can store high quality sound samples digitally and then replay these sounds on demand. Waveshaping synthesis is another approach that provides the user with a high degree of control over the spectral frame of an output signal. Sampled sounds are digitized and represented in the frequency domain as a spectral frame, containing a distinctive formant pattern. Using conventional techniques, the spectral frame can then be represented as a non-linear transfer function. Waveshaping synthesis is performed by driving the non-linear transfer function with a sinusoidal signal at a fundamental frequency. Waveshaping synthesis techniques were used in a few early digital music synthesizers such as the Buchla 400 series and, more recently, in the Korg 01/W.

FM and wavetable synthesis are the predominant multimedia synthesis methods. Waveshaping synthesis is an alternative technique that can also be used in applications involving the reproduction of human speech. To produce a sound having a particular tonal quality, the user must first select the appropriate transfer function containing the sprectral frame and formant pattern information. Musical tones are then produced by driving the transfer function with the appropriate fundamental frequency.

Human speech relies heavily on inflection to carry emotional content. A lack of inflection is therefore a disadvantage. Adding inflection to speech necessarily involves a shifting in a fundamental frequency of the speech. Any shift in the fundamental frequency, however, results in a corresponding shift in the formant pattern. The formant pattern, of course, must be reproduced without any substantive changes for the resulting speech to be understandable. Shifts in the formant pattern, therefore, result in a loss of speech intelligibility and reality.

One solution to speech synthesis that allows incorporation of inflection while retaining intelligibility is linear predictive coding (LPC), an intensely mathematical process that models a vocal cavity as a series of filters. LPC calculates coefficients of the filters independently of the fundamental frequency. Shifts in the fundamental frequency due to inflection therefore do not affect the formant patterns produced by the filters. While LPC is capable of providing inflected speech of a general model, its computational costs are prohibitive when using filters of a complexity necessary to reproduce the speech of a specific speaker. As a result, most existing speech synthesis techniques have used less complex filters, resulting in comically mechanical speech that is robotic., artificial, and devoid of emotional content.

Accordingly, what is needed in the art is a system and method for incorporating inflection into speech synthesis while avoiding a corresponding shift in the formant pattern and a resulting loss of intelligibility and reality.

SUMMARY OF THE INVENTION

To address the above-discussed deficiencies of the prior art, the present invention provides, for use in a synthesizer having a wave source that produces a periodic wave, frequency shifting circuitry for frequency-shifting the periodic wave and waveshaping circuitry for transforming the periodic wave into a waveform containing a formant, the frequency-shifting causing displacement of the formant, a circuit for, and method of, compensating for the displacement and a synthesizer employing the circuit or the method. In one embodiment, the circuit includes bias circuitry, coupled to the wave source and the frequency shifting circuitry, that introduces a bias into the periodic wave based on a degree to which the frequency shifting circuitry frequency shifts the periodic wave, the bias reducing a degree to which the formant is correspondingly displaced.

The present invention therefore introduces the broad concept of biasing the periodic wave before it is subsequently waveshaped to precompensate for any formant shifting that may occur when the resulting waveform is frequency-shifted. In a preferred embodiment of the present invention, the bias fully compensates for any formant frequency shifting, preserving the identity and character of the formant and thereby the intelligibility and reality of the resulting sound.

In one embodiment of the present invention, the bias is a DC bias. In this embodiment, the DC bias vertically shifts the periodic wave, without altering its amplitude or frequency.

In one embodiment of the present invention, the bias circuitry introduces a positive bias when the frequency shifting circuitry negatively frequency shifts (or decreases the frequency of) the periodic wave. Similarly, the bias circuitry introduces a negative bias when the frequency shifting circuitry positively frequency shifts (or increases the frequency of) the periodic wave.

In one embodiment of the present invention, the periodic wave is a sine wave. In another embodiment, the periodic wave is a low harmonic content wave, resulting in an easily predictable spectrum. Of course, the periodic wave may be any non-sine periodic wave. In fact, the periodic wave is merely required to be periodic for only a few cycles, and therefore may take the form of a pulse.

In one embodiment of the present invention, the periodic wave is digitally represented, the bias circuitry adding or subtracting the bias to digital numbers representing the periodic wave. Alternatively, the periodic wave may be analog, the bias altering an average voltage of the periodic wave.

In one embodiment of the present invention, the waveshaping circuitry comprises a memory containing a plurality of waveshaping transfer functions arranged into a lookup table. Those skilled in the art are familiar with lookup tables containing waveshaping transfer functions. The present invention is employable with such tables, although it is not constrained to be so employable.

In one embodiment of the present invention, the bias and the degree bear a linear relationship. Alternatively, certain applications may dictate that the bias and the degree bear a nonlinear relationship to compensate properly for extreme frequency shifts in the resulting waveform.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
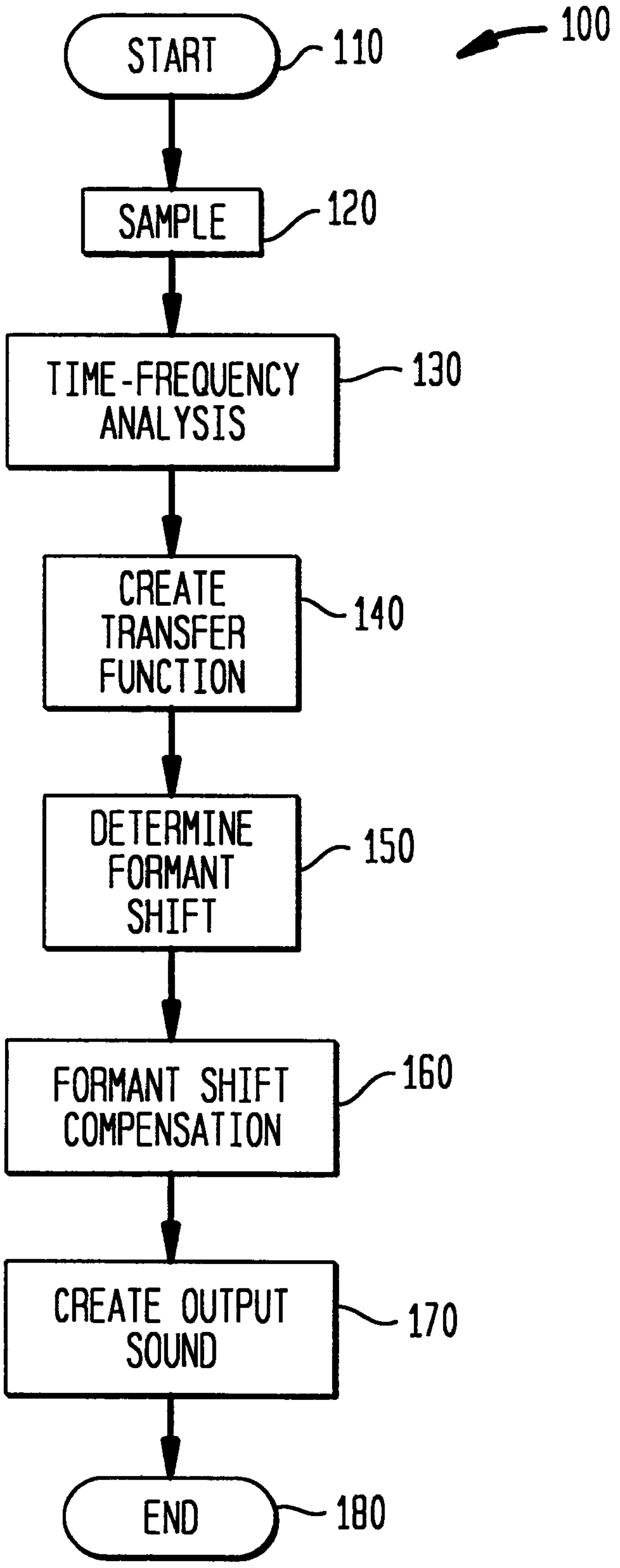
FIG. 1 illustrates a flow diagram of a method for synthesizing sounds constructed according to the principles of the present invention.
Figure 2A:
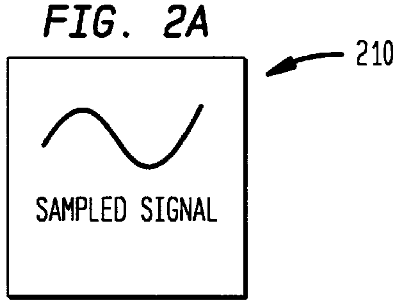
FIG. 2A illustrates a sampled signal in a time domain.
Figure 2B:
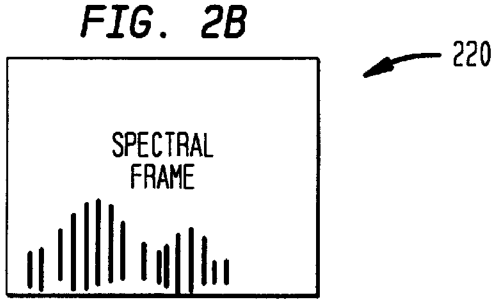
FIG. 2B illustrates a spectral frame of the sampled signal.
Figure 2C:
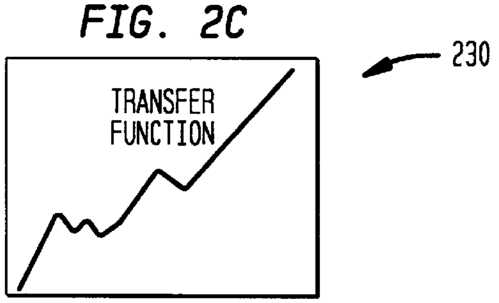
FIG. 2C illustrates a waveshaping transfer function derived from the spectral frame.
Figure 2D:
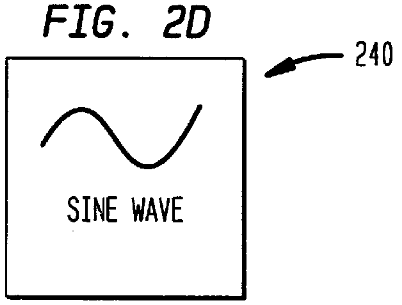
FIG. 2D illustrates a sine wave at the fundamental frequency of the output sound.
Figure 2E:
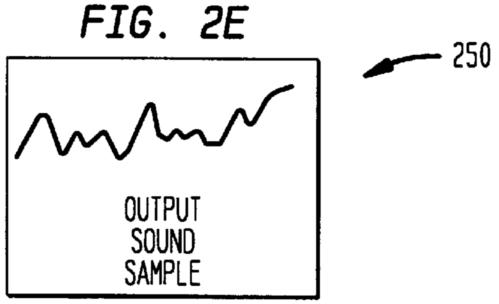
FIG. 2E illustrates an output sound sample.

Referring initially to FIG. 1, illustrated is a flow diagram of a method, generally designated 100, for synthesizing sounds constructed according to the principles of the present invention. The method begins in a start step 110. In a sampling step 120, conventional digital sampling techniques are used to capture an analog waveform and produce therefrom a sampled signal. One common sampling technique is Pulse Code Modulation (PCM), wherein the analog waveform is sampled and quantized to yield a sequence of digital numbers. For speech signals, conventional quantization methods having steps that increase logarithmically as a function of signal amplitude are preferred.

Next, in a time-frequency analysis step 130, the sampled signal is transformed from a time-domain signal into a frequency-domain signal or "spectral frame." One common method for transforming the sampled signal is Fourier transforming, which allows the sampled signal to be represented as a set of Fourier coefficients.

Next, in a waveshaping transfer function creation step 140, the spectral frame is converted to a waveshaping transfer function by conventional methods. One commonly used method, spectral matching waveshaping, scales the harmonics with a corresponding sum of Chebyshev polynomials. The resulting non-linear waveshaping transfer function thus represents a spectral frame and its formant pattern.

Next, in a formant shift determination step 150, a frequency shift is computed. For speech-related applications, the frequency shift corresponds to an amount of inflection desired in the synthesized speech. Then, in a formant shift compensation step 160, a sine wave of appropriate fundamental frequency (to be described in greater detail below) is altered in both frequency and bias.

For speech, rising inflections are obtained by increasing the fundamental frequency of the sine wave and biasing the sine wave negatively. Similarly, falling inflections are obtained by decreasing the fundamental frequency and biasing the sine wave positively. Introducing the bias into the sine wave raises or lowers a perceived formant center of a resulting output sound, thus counteracting (partially or completely) alterations in the formant pattern caused by shifts in the fundamental frequency. Those skilled in the art will realize that frequency-shifting and biasing of the formant shift compensation step 160 may occur concurrently or sequentially in any order and that the formant shift determination step 150 and formant shift compensation step 160 may also be performed at any time prior to or concurrent with the waveshaping transfer function creation step 140.

Next, in an output sound creation step 170, the shifted sine wave is applied to the waveshaping transfer function, resulting in the output sound having both a required formant pattern and a required frequency shift. In speech synthesis applications, the resulting speech possesses both intelligibility, due to preservation of the formant pattern, and inflection, due to the shift in the fundamental frequency. The method then ends in an end step 180.

Turning now to FIG. 2, illustrated are examples of simplified waveforms associated with the method of FIG. 1. More specifically, FIG. 2A illustrates a sampled signal 210 in a time domain. FIG. 2B illustrates a spectral frame 220 of the sampled signal 210. FIG. 2C illustrates a waveshaping transfer function 230 derived from the spectral frame 220. FIG. 2D illustrates a sine wave 240 at the fundamental frequency of the output sound. FIG. 2E illustrates an output sound sample 250.

With continuing reference to FIG. 1, the sampled signal 210 is captured by the sampling step 120. The spectral frame 220, a frequency-domain representation of the sampled signal 210, is generated by the time-frequency analysis step 130. The waveshaping transfer function creation step 140 is then used to convert the spectral frame 220 into the waveshaping transfer function 230. Then, once the frequency shift is computed by the formant shift determination step 150, the formant shift compensation step 160 shifts the sine wave 240 in both frequency and bias to compensate for formant shifts. The output sound sample 250 is then produced at the output sound creation step 170 by applying the sine wave 240 to the waveshaping transfer function 230.

Figure 3:
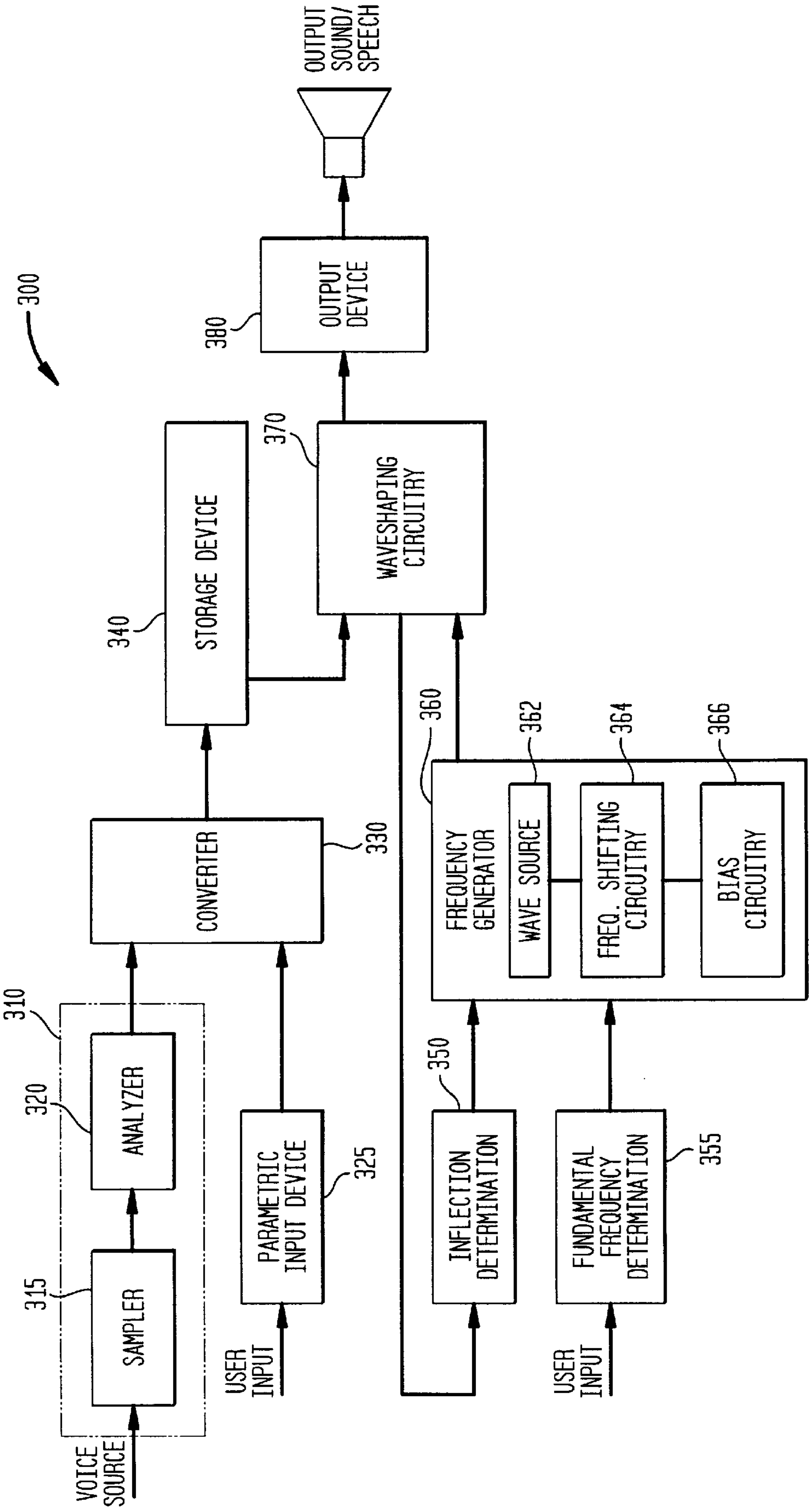
FIG. 3 illustrates a speech synthesis system, or "synthesizer," constructed according to the principles of the present invention.

Turning now to FIG. 3, illustrated is a block diagram of an embodiment of a speech synthesis system or synthesizer 300 constructed according to the principles of the present invention. The synthesizer 300 includes a time domain input device 310 having a voice sampler 315 and an analyzer 320. The voice sampler 315 receives an input signal from an input voice source and creates therefrom a sampled signal. In one embodiment of the present invention, the voice sampler 315 uses PCM, a conventional digital sampling technique that captures the analog input signal and converts it into a sequence of digital numbers. Of course, the use of other sampling techniques is well within the broad scope of the present invention. The analyzer 320, coupled to the sampler 315, then performs time-frequency analysis on the sampled signal to create a spectral frame of the input signal. The analysis may be performed by specialized electronic circuitry (e.g., application specific integrated circuits (ASIC) or digital signal processing (DSP) circuitry) or may simply be performed by a conventional processor in a general purpose personal computer.

The synthesizer 300 also include s a parametric input device 325 that allows a user to directly input a spectral frame into the synthesizer 300 by specifying centers and widths of formants in the spectral frame. Those skilled in the art will realize that the synthesizer 300 may include both the parametric input device 325 and the time domain input device 310, or alternatively, the synthesizer 300 may include only one of either the parametric input device 325 or the time domain input device 310. Of course, neither the parametric input device 325 nor the time domain input device 310 is an integral part of the present invention.

The synthesizer 300 further includes a converter 330, coupled to the time domain input device 310 and the parametric input device 325, that converts the spectral frame into a waveshaping transfer function. Conventional methods for converting the spectral frame into the waveshaping transfer function are familiar to those skilled in the art and will not be discussed further. The synthesizer 300 still further includes a storage device (memory) 340 wherein the waveshaping transfer functions are stored. In a preferred embodiment, the waveshaping transfer functions are arranged in a lookup table. Those skilled in the art are familiar with a wide variety of conventional storage devices, such as hard drives, diskettes, read-only memory (ROM) and random access memory (RAM).

The synthesizer 300 further includes inflection determination circuitry 350 that receives information from waveshaping circuitry 370 and employs the information to analyze the speech to be produced and determine therefrom an amount and direction of inflection desired. The synthesizer 300 further includes fundamental frequency determination circuitry 355 that allows the user to select a fundamental frequency of the speech. The fundamental frequency selected may depend on various factors such as whether the synthesized speech is intended to represent male or female speech. Males typically produce voiced sounds with a fundamental frequency between 80 and 160 Hz while females typically produce fundamental frequencies around 200 Hz and higher.

The synthesizer 300 further includes a frequency generator 360, coupled to the inflection determination circuitry 350 and the fundamental frequency determination circuitry 355. The frequency generator 360 includes a wave source 362, capable of producing a periodic wave at the fundamental frequency of the speech. In a preferred embodiment, the wave source 362 produces a sine wave. Of course, the use of other periodic waveforms is well within the broad scope of the present invention. The frequency generator 360 further includes frequency shifting circuitry 364, coupled to the wave source 362, that shifts a frequency of the periodic wave based on the amount and direction of inflection desired. The frequency generator 360 still further includes bias circuitry 366, coupled to both the wave source 362 and the frequency shifting circuitry 364, that introduces a bias into the periodic wave based on a degree to which the frequency of the periodic wave is shifted.

In one embodiment of the present invention, the bias introduced bears a linear relationship to the frequency shift of the periodic wave (the degree to which the periodic wave is frequency shifted). Alternatively, for certain applications wherein extreme frequency shifts are required, the bias may bear a nonlinear relationship to the frequency shift. The frequency generator 360 thus generates a fundamental frequency having an appropriate frequency and bias based on information derived from the inflection determination device 350 and the fundamental frequency determination device 355. For rising inflections, the frequency generator 360 increases the fundamental frequency while reducing its bias. Conversely, for falling inflections, the frequency generator 360 decreases the fundamental frequency while increasing its bias. Shifting the bias of the fundamental frequency raises and lowers a perceived formant center, counteracting changes in the formant pattern caused by shifts in the fundamental frequency. In a preferred embodiment, the periodic wave is digitally represented, the bias circuitry 366 adding or subtracting the bias to digital numbers representing the periodic wave. Alternatively, the periodic wave may be an analog signal, the bias circuitry 366 introducing a DC offset or DC bias to alter an average voltage of the periodic wave. Again, it is important to note that the frequency-shifting and biasing of the periodic wave can occur sequentially in interchangeable order or concurrently.

The synthesizer 300 further includes waveshaping circuitry 370, coupled to both the storage device 340 and the frequency generator 360. The waveshaping circuitry 370 takes the fundamental frequency and applies a waveshaping transfer function to create a waveform containing a formant pattern. In one embodiment of the present invention, the waveshaping circuitry 370 includes the storage device 340 wherein a number of waveshaping transfer functions are stored. Alternatively, the waveshaping circuitry 370 and storage device 340 may be separate circuits. The waveform may then be converted into an output sound and made available at an output device 380 such as a speaker. The synthesizer 300 thus allows speech to be synthesized with natural inflections, while maintaining its intelligibility to listeners, without the use of computationally costly filters.

Those skilled in the art will recognize that the synthesizer illustrated and described herein is not limited to applications involving speech but may be used in any application requiring preservation of a particular formant pattern, while changing its fundamental frequency. For a better understanding of speech and sound synthesis, see D. Arfib, *Digital Synthesis of Complex Spectra by Means of Multiplication of Non-Linear Distorted Sine Waves*, Proceedings of the International Computer Music Conference, Northwestern University (1978); J. W. Beauchamp, *Analysis and Synthesis of Cornet Tones Using Non-Linear Interharmonic Relationships*, Journal of the Audio Engineering Society, Vol. 23, No. 6 (1979); James Beauchamp, *Brass Tone Synthesis by Spectrum Evolution Matching with Non-Linear Functions*, Computer Music Journal, Vol. 3, No. 2. (1979); John F. Koegel Buford, *Multimedia Systems,* ACM Press (1994); Charles Dodge and Thomas A. Jerse, Computer Music, Schirmer Books (1985); Marc LeBrun, *Digital Waveshaping Synthesis,* Journal of the Audio Engineering Society, Vol. 27, No. 4 (1979); Werner Kaegi and Stan Tempelaars, *VOSIM—A New Sound Synthesis System,* Journal of the Audio Engineering Society, Vol. 26, No. 6 (1978); F. Richard Moore, Elements of Computer Music, Prentice Hall (1990); C. Roads, *The Computer Music Tutorial*, MIT Press (1996); X. Rodet, *Time-Domain Formant-Wave-Functions Synthesis,* Actes du NATO-ASI Bonas, (July 1979); C. Y. Suen, *Derivation of Harmonic Equations in Non-Linear Circuits*, Journal of the Audio Engineering Society, Vol. 18, No. 6 (1970) which are incorporated herein by reference.

Although the present invention has been described in detail, those skilled in the art should understand that they can make various changes, substitutions and alterations herein without departing from the spirit and scope of the invention in its broadest form.

What is claimed is:

1. For use in a synthesizer having a wave source that produces a periodic wave, frequency shifting circuitry for frequency-shifting said periodic wave and waveshaping circuitry for transforming said periodic wave into a waveform containing a formant, said frequency-shifting causing displacement of said formant, a circuit for compensating for said displacement, comprising:

bias circuitry, coupled to said wave source and said frequency shifting circuitry, that introduces a bias into said periodic wave based on a degree to which said frequency shifting circuitry frequency shifts said periodic wave, said bias reducing a degree to which said formant is correspondingly frequency-shifted.

2. The circuit as recited in claim 1 wherein said bias is a DC bias.

3. The circuit as recited in claim 1 wherein said bias circuitry introduces a positive bias when said frequency shifting circuitry negatively frequency shifts said periodic wave.

4. The circuit as recited in claim 1 wherein said periodic wave is a sine wave.

5. The circuit as recited in claim 1 wherein said periodic wave is digitally represented, said bias circuitry adding or subtracting said bias to digital numbers representing said periodic wave.

6. The circuit as recited in claim 1 wherein said waveshaping circuitry comprises a memory containing a plurality of waveshaping transfer functions arranged into a lookup table.

7. The circuit as recited in claim 1 wherein said bias and said degree bear a linear relationship.

8. For use in a synthesizer having a wave source that produces a periodic wave, frequency shifting circuitry for frequency-shifting said periodic wave and waveshaping circuitry for transforming said periodic wave into a waveform containing a formant, said frequency-shifting causing displacement of said formant, a method of compensating for said displacement, comprising the steps of:

introducing a bias into said periodic wave based on a degree to which said frequency shifting circuitry frequency shifts said periodic wave; and frequency-shifting said waveform, said bias reducing a degree to which said formant is correspondingly frequency-shifted.

9. The method as recited in claim 8 wherein said step of introducing comprises the step of introducing a DC bias into said periodic waveform.

10. The method as recited in claim 8 wherein said step of introducing comprises the step of introducing a positive bias when said frequency shifting circuitry negatively frequency shifts said periodic wave.

11. The method as recited in claim 8 wherein said periodic wave is a sine wave.

12. The method as recited in claim 8 wherein said periodic wave is digitally represented, said step of introducing comprising the step of adding or subtracting said bias to digital numbers representing said periodic wave.

13. The method as recited in claim 8 wherein said waveshaping circuitry comprises a memory containing a plurality of waveshaping transfer functions arranged into a lookup table.

14. The method as recited in claim 8 wherein said bias and said degree bear a linear relationship.

15. A synthesizer, comprising:

a wave source that produces a sine wave;

frequency shifting circuitry for frequency-shifting said sine wave;

waveshaping circuitry for transforming said sine wave into a waveform containing a formant, said frequency-shifting causing displacement of said formant; and bias circuitry, coupled to said wave source and said frequency shifting circuitry, that introduces a bias into said sine wave based on a degree to which said frequency shifting circuitry frequency shifts said sine wave, said bias reducing a degree to which said formant is correspondingly displaced.

16. The synthesizer as recited in claim 15 wherein said bias is a DC bias.

17. The synthesizer as recited in claim 15 wherein said bias circuitry introduces a positive bias when said frequency shifting circuitry negatively frequency shifts said sine wave.

18. The synthesizer as recited in claim 15 wherein said sine wave is digitally represented, said bias circuitry adding or subtracting said bias to digital numbers representing said sine wave.

19. The synthesizer as recited in claim 15 wherein said waveshaping circuitry comprises a memory containing a plurality of waveshaping transfer functions arranged into a lookup table.

20. The synthesizer as recited in claim 15 wherein said bias and said degree bear a linear relationship.

* * * * *